United States Patent [19]

Chung et al.

[11] Patent Number: 4,554,314
[45] Date of Patent: Nov. 19, 1985

[54] THERMOPLASTIC MOLDING COMPOSITIONS

[75] Inventors: James Y. J. Chung, Wexford; Dieter Neuray; Mark W. Witman, both of Pittsburgh, all of Pa.

[73] Assignee: Mobay Chemical Corporation, Pittsburgh, Pa.

[21] Appl. No.: 673,057

[22] Filed: Nov. 19, 1984

Related U.S. Application Data

[63] Continuation-in-part of Ser. No. 494,826, May 16, 1983, abandoned.

[51] Int. Cl.$^4$ ............................................ C08L 67/02
[52] U.S. Cl. ..................... 525/67; 524/504; 525/64
[58] Field of Search ........................................ 525/67

[56] References Cited

U.S. PATENT DOCUMENTS

| | | | |
|---|---|---|---|
| 3,130,177 | 4/1964 | Grabowski | 260/45.5 |
| 3,162,695 | 12/1964 | Grabowski | 260/873 |
| 3,864,428 | 2/1975 | Nakamura et al. | 260/873 |
| 4,180,494 | 12/1979 | Fromuth et al. | 260/40 R |

Primary Examiner—John C. Bleutge
Assistant Examiner—Patricia Short
Attorney, Agent, or Firm—Gene Harsh; Lawrence S. Pope; Aron Preis

[57] ABSTRACT

The present invention is directed to thermoplastic molding compositions comprising a blend of poly(alkylene terephthalate) and polycarbonate resins characterized in that the weight ratio between said resins is about 1:1 to 4:1 and in that a graft modified polybutadiene rubber is added thereto, said compositions exhibiting an improved level of impact strength.

3 Claims, No Drawings

THERMOPLASTIC MOLDING COMPOSITIONS

This application is a continuation-in-part application of copending application Ser. No. 494,826, filed May 16, 1983, now abandoned.

FIELD OF THE INVENTION

The invention relates to thermoplastic molding compositions and in particular, to impact modified blends of polyalkylene terephthalate and polycarbonate resin.

BACKGROUND OF THE INVENTION

Improved properties and processability of polycarbonate has been disclosed in U.S. Pat. No. 3,130,177 and U.S. Pat. No. 3,162,695 to result upon the blending therewith a butadiene graft polymer; blends of polycarbonate and polyester, modified by a butadiene graft copolymer were disclosed in U.S. Pat. No. 3,864,428. Also, similar systems were disclosed in U.S. Pat. No. 4,180,494 to offer improved solvent resistance.

The present invention is based on the surprising and unexpected level of impact strength, especially at low temperatures, associated with a particular composition comprising polyalkylene terephthalate and polycarbonate resins having a certain weight ratio therebetween and a particular graft elastomer which is characterized in that its elastomeric core is predominantly of polybutadiene.

SUMMARY OF THE INVENTION

The present invention is directed to thermoplastic molding compositions comprising a blend of poly(alkylene terephthalate) and polycarbonate resins characterized in that the weight ratio between said resins is about 1:1 to 4:1 and in that a graft modified polybutadiene rubber is added thereto, said compositions exhibiting an improved level of impact strength.

DETAILED DESCRIPTION OF THE INVENTION AND ITS PREFERRED EMBODIMENTS

The high molecular weight, thermoplastic polyester resins suitable in the practice of the invention are derived from an aromatic dicarboxylic acid and a diol component and are characterized in that their intrinsic viscosity is at least 0.4 deciliters per gram. Optionally, the aromatic dicarboxylic acid component accounts for at least 85 mole percent of the dicarboxylic acid component. Among the suitable aromatic dicarboxylic acids are terephthalic acid, isophthalic acid, naphthalenedicarboxylic acid, diphenylether dicarboxylic acid, diphenyldicarboxylic acid, diphenylsulfone dicarboxylic acid and diphenoxyethane dicarboxylic acid. The optional, at most 15 mole percent of the acid component which is not aromatic dicarboxylic, may be represented by hydroxycarboxylic acids and by aliphatic dicarboxylic acids such as succinic acid, adipic acid and sebacic acid.

The diol component of these polyesters may contain from 2 to 10 carbon atoms, preferably from 2 to 4 carbon atoms in the form of linear methylene chains with up to 30 mole percent of one or more other aliphatic diols having 3 to 8 carbon atoms, cycloaliphatic diols having from 6 to 15 carbon atoms or aromatic diols having from 6 to 21 carbon atoms. Examples of such additional diols ("codiols") include 3-methylpentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane.

Typical examples of the diol include polymethylene-α,ω-diols such as ethylene glycol, trimethylene glycol, tetramethylene glycol and hexamethylene glycol, neopentyl glycol, cyclohexane dimethylol, tricyclodecane dimethylol, 2,2-bis-(4-β-hydroxyethoxy-phenyl)-propane, 4,4'-bis-(β-hydroxyethoxy)-diphenylsulfone, and diethylene glycol.

The polyesters may be branched by incorporating trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable to use no more than 1 mole percent of branching agent, based on the quantity of acid component. The polyesters may also contain known monofunctional compounds such as phenol or benzoic acid as chain terminators.

The preferred polyesters are characterised in that their structure comprises units of the general formula (I):

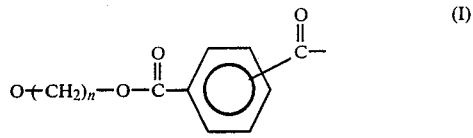

wherein n denotes 2 to 4.

The intrinsic viscosity characterizing the suitable polyester resins in the practice according to the invention should preferably be in the range of 0.4 to 1.4 grams per deciliter and, more preferably, between 0.4 and 1.1 grams per deciliter, as measured in a 1% solution of phenol and tetrachloroethane (60:40) at 25° C.

Methods for the preparation of the polyester resin suitable in the present context are known and have been described in U.S. Pat. Nos. 2,463,319 and 3,047,539.

The composition of the invention may include crystallization rate promoters for the polyester (such as oligomeric polyesters) to allow lower mold temperatures and shorter injection cycles. Suitable promoters have been taught in U.S. Pat. No. 4,223,113 which disclosure is incorporated herein by reference.

The most preferred poly(alkylene terephthalate) in the present context is poly(ethylene terephthalate).

The polycarbonate resins useful in the practice of the invention are homopolycarbonate, copolycarbonate and terpolycarbonate resins or mixtures thereof. The polycarbonate resins generally have molecular weights of 10,000–200,000 (weight average molecular weight) preferably 20,000–80,000, and are additionally characterized by their melt flow of 1–24 gm/10 min. at 300° C. per ASTM D-1238. These polycarbonate resins may be prepared, for example, by the known diphasic interface process from phosgene and dihydroxy compounds by polycondensation (see the monograph H. Schnell, *Chemistry and Physics of Polycarbonates*, Interscience Publishers, New York, 1964, incorporated herein by reference).

In the present context, dihydroxy compounds suitable for the preparation of the polycarbonates of the invention conform to the structural formula (1) or (2)

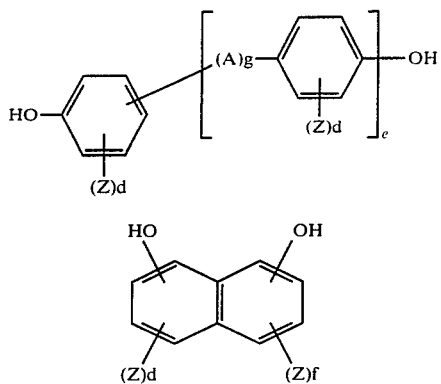

(1)

(2)

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom: S, —SO— or —SO$_2$— radical; a radical of the general formula

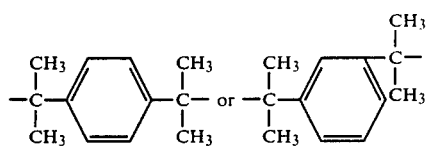

g denotes the number of 0 or 1;
e denotes the number of 0 or 1
Z denotes F, Cl, Br or C$_1$14 C$_2$ alkyl and if several Z radicals are substituents in one aryl radical, they may be identical or different;
d denotes 0 or an integer of from 1 to 4: and
f denotes 0 or an integer of from 1 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-di-isopropyl-benzenes. These and further suitable aromatic dihydroxy compounds are described, for example in U.S. Pat. Nos. 3,028,365; 2,999,835: 3,148,172; 3,271,368; 2,991,273, 3,271,367; 3,280,078: 3,014,891 and 2,999,846 (all incorporated herein by reference), in German Offenlegungsschriften (German Published Specifications) Nos. 1,570,703: 2,063,050, 2,063,052: 2,211,956 and 2,211,957, in French Patent Specification No. 1,561,418 and in the monograph, H. Schnell, *Chemistry and Physics of Polycarbonates*, Interscience Publishers, New York, 1964. Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane, hydroxybenzophenone and 4,4'-sulfonyl diphenol.

The most preferred bisphenol is 2,2-bis(4-hydroxyphenyl)-propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Patent Nos. 1,046,311 and 962,274 and in U.S. Pat. Nos. 3,248,414: 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention, monofunctional reactants such as monophenols may be used in order to limit their respective molecular weights. Also, branching agents may be employed. Branching may be obtained by the incorporation of small amounts, preferably of between about 0.05 and 2.0 mol percent (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533: 1,595,762: 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis((4'-4"-dihydroxytriphenyl)-methyl)-benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

Among the resins suitable in the practice of the invention are included phenolphthalein based polycarbonate, copolycarbonates and terpolycarbonates such as are described in U.S. Pat. Nos. 3,036,036 and 4,210,741, both incorporated by reference herein.

The graft elastomer suitable in the present context is characterized in that its core is substantially of polybutadiene and that its grafted phase comprises styrene and acrylonitrile, and further in that the polybutadiene content of the graft elastomer is at least 60%, preferably 65 to 90%, relative to the weight of the graft elastomer. In these grafts, a monomer mixture of styrene and acrylonitrile is graft Polymerized onto the prepolymerized rubber core; cross-linking of the rubber core is an optional feature of the graft elastomer of the invention.

Suitable rubbers are polybutadiene, butadiene/styrene copolymers having up to 30% by weight of copolymerized styrene, copolymers of butadienes and acrylonitrile with up to 20% by weight of acrylonitrile and copolymers of butadiene with up to 20% by weight of a lower alkyl ester of an acrylic or methacrylic acid (for example, methylacrylate, ethylacrylate, methylmethacrylate and ethylmethacrylate).

The weight ratio of the rubbery core to the grafted phase is within the range of 80:20 to about 60:40. The most preferred graft elastomer of the present invention is characterized in that its core is of polybutadiene only and constitutes 70 to 80 percent by weight of the graft elastomer and further by the weight ratio between its grafted monovinyl aromatic hydrocarbon (for instance, styrene) and its grafted acrylonitrile-type compound (for instance, acrylonitrile). The weight ratio of these is in the range of 74/26 and 66/34. Even most preferably, the acrylonitrile-type compound constitutes about 41–50 mole % relative to the total molar amount of the grafted phase.

The preparation of graft elastomers of the type suitable in the present context has been described in the art, for instance, in U.S. Pat. Nos. 3,238,275 and in 3,919,353 both incorporated by reference herein.

Essentially, the molecules of acrylonitrile-butadiene-styrene (ABS) graft polymers consist of two or more polymeric parts of different compositions chemically united. The graft polymers may be prepared by polymerizing at least one conjugated diene, such as butadiene, or a conjugated diene with a monomer polymerizable therewith, such as noted above to provide a backbone (a core) with subsequent polymerization of at least one grafting monomer, and preferably two, in the presence of the prepolymerized backbone to complete the graft polymer.

The backbone, as mentioned, is preferably a conjugated diene polymer or copolymer such as polybutadiene, a butadiene-styrene, butadiene-acrylonitrile or the like.

A specific conjugated diene monomer which may be utilized in preparing the backbone of the graft polymer is generically described by the formula:

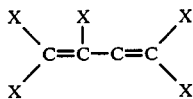

wherein X may be selected from the group consisting of hydrogen, alkyl groups containing from 1 to 5 carbon atoms, chloro and bromo. Examples of dienes that may be used are butadiene; isoprene: 1,2-heptadiene; methyl-1,3-pentadiene: 2,3-dimethyl-1,3-butadiene: 1,3-pentadiene: 2-methyl-3-ethyl-1,3-butadiene: 2-ethyl-1,3-pentadiene: 1,3- and 2,4-hexadiene, chloro and bromo-substituted butadienes such as dichlorobutadiene, bromobutadiene, chloroprene, dibromobutadiene, mixtures thereof and the like. The preferred conJugated diene utilized herein is butadiene.

The first monomer or group of monomers polymerized in the presence of the prepolymerized backbone are preferably monovinyl aromatic hydrocarbons. The monovinyl aromatic monomers utilized are generically described by the formula:

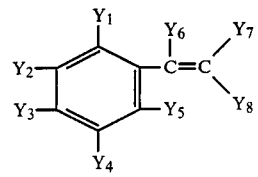

wherein $Y_1$–$Y_8$ independently are selected from the group consisting of hydrogen, alkyl groups containing from 1 to 5 carbon atoms, chloro and bromo. Examples of the monovinyl aromatic compounds and substituted monovinyl aromatic compounds that may be used are styrene and other vinyl-substituted aromatic compounds including alkyl-, cycloalkyl-, aryl-, alkaryl-, aralkyl-, alkoxy-, arloxy- and other substituted vinyl aromatic compounds. Examples of such compounds are 3-methylstyrene; 3,5-diethylstyrene and 4-n-propylstyrene, α-methylstyrene, α-methylvinyltoluene, α-chlorostyrene, vinyltoluene, α-bromostyrene, chlorophenyl-ethylenes, dibromophenylethylenes, tetrachlorophenylethylenes, 1-vinylnaphthalene, 2-vinylnaphthalene, mixtures thereof and the like. The preferred monovinyl aromatic hydrocarbon used herein is styrene and/or α-methylstyrene.

The second group of monomers that are polymerized in the presence of the prepolymerized backbone are acrylonitrile and/or substituted acrylonitrile. The acrylonitrile and substituted acrylonitrile are described generically by the formula

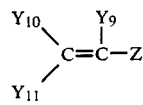

wherein $Y_9$–$Y_{11}$ independently are selected from the group consisting of hydrogen, alkyl groups containing from 1 to 5 carbon atoms, chloro and bromo and Z is selected from the group consisting of cyano and carbalkoxy wherein the alkyl group of the carbalkoxy group contains from 1 to about 12 carbon atoms. Examples are acrylonitrile, α-chloroacrylonitrile, β-chloroacrylonitrile, α-bromoacrylonitrile and β-bromoacrylonitrile. The preferred acrylic monomer used herein is acrylonitrile.

The compositions of the present invention are characterized in that the polyalkylene terephthalate resin and the polycarbonate resin are present therein at a weight ratio therebetween of from about 1:1 to about 4:1, preferably from about 1.5:1 to about 3.0:1.0. Further the compositions are characterized in that they contain an impact modifying amount, preferably about 5 to 25%, more preferably 10 to 20% of the graft polymer, said percentages being in relation to the total weight of the polyalkylene terephthalate, polycarbonate and graft elastomer.

The compositions of the invention may contain additives and agents such as are known in the art to impart certain properties in thermoplastic molding compositions. Among these are plasticizers, heat and hydrolytic stabilizers, pigments, fillers, reinforcement agents and flame retardants of various types.

The materials used in the course of the preparation of the compositions noted below were as follows:

Polyethylene terephthalate—Vituf 1001A, having an intrinsic viscosity of about 1.04, available commercially from Goodyear Tire and Rubber Company, Ohio.

Polycarbonate—Merlon M—50, —a bisphenol A based homopolycarbonate characterized in that its melt index per ASTM D-1238 is about 3.0 to 5.9 gm/10 min., available from Mobay Chemical Corporation, Pittsburgh, Pa.

Graft elastomer Type A—Acryloid KM 653 a methylmethacrylate styrene graft butadiene having a polybutadiene content of about 70 percent by weight and characterized in that its Tg is about −81° C. and in that its styrene content is about 20 percent and its methylmethacrylate content is about 10 percent, available from Rohm & Haas Corporation, Philadelphia, Pa.

Graft Elastomer—Type B—an acrylonitrile styrene graft butadiene characterized in that its Tg is about −86° C. having a polybutadiene content of about 75 percent by weight and in that its S/AN ratio is about 72/28, available from Bayer AG.

Graft Elastomer—Type C—same as Type B except that its polybutadiene content is about 50 percent by weight.

Other components included in all of the compositions and asserted to have no criticality insofar as the surprising impact strength of the compositions of the invention, were added at levels of 0.2 to 0.9 phr (per hundred weight of the polyethylene terephthalate, polycarbonate and graft-elastomer). These were as an antioxidant: an octadecyl-3-(3′, 5′-di-tertbutyl-4′-hydroxyphenyl) propionate, as a stabilizer: a tris-[3-ethyl-oxetanyl)-3-methyl]-phosphite carbon black and talc (max. particle size 12 microns).

The extrusion of the compositions of Example 5 and Comparison Example 5 was carried out on a 1½ in. Hartig extruder 2.75/1 screw, speed 80 rpm, screw set 57, screen pack 20-40-60: temperature profile: rear 270° C., middle 265° C., front 270° C. and die 234° C.

The compositions indicated as Examples 1–4 and the Comparison Examples 1–4 were extruded in a twin screw ZSK 53 mm extruder at conditions noted as:

| Pellet feeder - set (%): | 19 | |
|---|---|---|
| Extruder zone temperature (°C., set/read): | | |
| Zone 1 | Barrel | 260/255 |
| | Melt | 265 |
| Zone 2 | Barrel | 260/265 |
| | Melt | 255 |
| Zone 3 | Barrel | 200/202 |
| | Melt | 292 |
| Zone 4 | Barrel | 200/194 |
| | Melt | 270 |
| Zone 5 | Barrel | 240/252 |
| | Melt | 275 |
| Die | Body | 245/235 |
| | Melt | 267 |
| Screw speed (rpm) | 85 | |
| Torque (%) | 66 | |
| KWDC (KW) | 10.5 | |
| Vacuum (mm Hg) | 12 | |
| Amps | 75 | |

Extruded pellets, after drying at about 110° C. for about 16 hours in a hot air circulating oven, were injection molded using 4-oz. Newbury molding machine to prepare test bars. The injection molding conditions were as follows:

| Zone set temperature (°C.): | Rear | 260 |
|---|---|---|

-continued

| | Front | 260 |
|---|---|---|
| | Nozzle | 254 |
| | Mold Surface | 70 |
| Melt temperature (°C.): | | 260 |
| Cycle time (seconds): | Injection | 12 |
| | Cooling | 25 |
| | Total Cycle | 37 |
| Injection pressure (psi): | Primary | 850 |
| | Secondary | 800 |

The measurements of the Impact strength were carried out in accordance with ASTM D-256. The notched impact strength of gate/end sides were measured using two halves of a 5 inch long bar. The low temperature notched Izod impact strength (at −40° C.) was determined after immersing the test bar for one hour in a dry ice/methanol bath at −40° C.

The invention is further illustrated, but is not intended to be limited by the following examples in which all parts and percentages are by weight unless otherwise specified.

EXAMPLES

EXAMPLE 1

Compositions in accordance with the invention were prepared and evaluated. The evaluation entailed a comparison of their properties with those of compositions modified by a substantially similar, yet critically different graft elastomer. The comparisons clearly indicate the surprising consequences associated with seemingly minor structural-chemical characteristics of the respective grafts. The processing of the compositions below included blending of the resinous pellets which were dried at 80–100° C. overnight and the subsequent addition of the graft elastomers and talc (both dried at 80° C.). Extrusion was followed by injection molding.

| | 1 | Comp. Ex. 1 | Comp. Ex. 2 |
|---|---|---|---|
| Polyethylene terephthalate (%) | 43.0 | 43.0 | 43.0 |
| Polycarbonate, (%) | 43.0 | 43.0 | 43.0 |
| Graft elastomer, (%) | | | |
| Type A | — | 14.0 | — |
| Type B | 14.0 | — | — |
| Type C | — | — | 14.0 |
| Impact strength, Notched Izod (ft. lb/in) gate/end at | | | |
| 23° C. | 13.4/14.6 | 12.1/12.2 | 2.2/3.2 |
| −40° C. | 4.5/4.6 | 2.4/2.3 | 1.8/1.8 |

EXAMPLES 2–3

Compositions in accordance with the invention were prepared and tested as shown below. The preparation of these and of the comparison compositions follows the procedure described above.

| | 2 | Comp. Ex. 3 | 3 | Comp. Ex. 4 |
|---|---|---|---|---|
| Polyethylene terephthalate, % | 51.0 | 51.0 | 54.0 | 54.0 |
| Polycarbonate, % | 34.0 | 34.0 | 36.0 | 36.0 |
| Graft Elastomer, % | | | | |
| Type A | — | 15.0 | — | 10.0 |
| Type B | 15.0 | — | 10.0 | — |

-continued

| | Comp. Ex. 2 | 3 | Comp. Ex. 3 | Comp. Ex. 4 |
|---|---|---|---|---|
| Impact strength, Notched Izod ft. lb/in. gate/end | | | | |
| at 23° C. | 17.2/17.6 | 15.9/15.7 | 17.4/16.8 | 16.1/14.8 |
| −40° C. | 11.8/12.6 | 2.6/2.8 | 9.0/10.4 | 2.3/2.8 |

EXAMPLES 4-5

Further compositions in accordance with the invention were prepared and set in comparison as noted below. The preparation of these compositions followed the procedure indicated above except that extrusion was carried out using a Hartig extruder (see above).

| | 4 | 5 | Comp. Ex. 5 |
|---|---|---|---|
| Polyethylene terephthalate, % | 59.5 | 68.0 | 68.0 |
| Polycarbonate, % | 25.5 | 17.0 | 17.0 |
| Graft elastomers, % | | | |
| Type A | — | — | 15.0 |
| Type B | 15.0 | 15.0 | — |
| Impact strength, Notched Izod ft. lb./in. gates/end | | | |
| at 23° C. | 21.0/20.6 | 18.7/18.7 | 19.9/17.8 |
| −40° C. | 14.9/13.2 | 4.3/3.9 | 3.9/3.7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising:
   (i) a polyethylene terephthalate resin characterized in that its intrinsic viscosity as measured in a 1% solution of phenol and tetrachloroethane (60:40) at 25° C. is at least 0.4 deciliters per gram,
   (ii) an aromatic polycarbonate resin, and about 5 to 25% relative to the total weight of said (i), (ii) and (iii) of
   (iii) a graft elastomer having a rubbery core to graft phase ratio of 70/30 to 80/20 characterized in that its core consists of polybutadiene and that its graft phase consists of the polymerization product of (a) at least one member selected from the group consisting of monovinyl aromatic hydrocarbons described by the formula

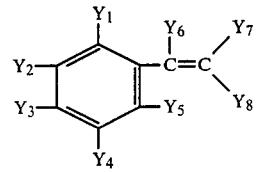

wherein $Y_1$–$Y_8$ independently denote a hydrogen, chlorine or bromine atom or a $C_1$–$C_5$ alkyl radical and (b) at least one acrylonitrile type compound conforming to

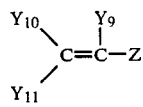

wherein $Y_9$–$Y_{11}$ independently denote a hydrogen, chlorine or bromine atom or a $C_1$–$C_5$ alkyl radical and Z denotes a cyano radical, said (a) relating to said (b) by weight as 74/26 to 66/34, said composition being further characterized in that said (i) relates to said (ii) by weight as 1:1 to 4:1.

2. The composition of claim 1 wherein said monovinyl aromatic hydrocarbon is styrene and said acrylonitrile type compound is acrylonitrile itself.

3. The thermoplastic molding composition of claim 1 wherein said polycarbonate resin is derived from bisphenol A.

* * * * *